Oct. 20, 1936.	W. H. MOSS	2,057,690
ELECTRICAL CONDUCTOR
Filed Nov. 30, 1931
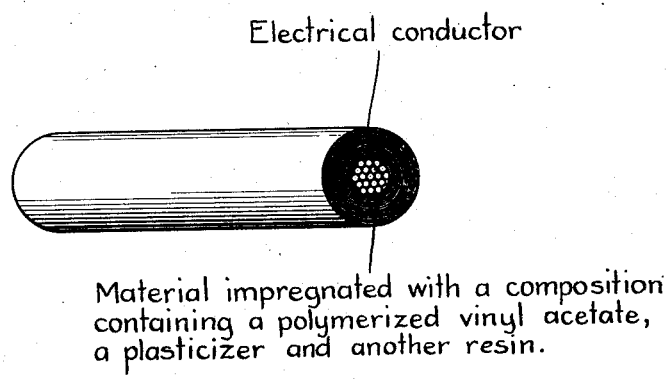
Electrical conductor
Material impregnated with a composition containing a polymerized vinyl acetate, a plasticizer and another resin.
INVENTOR
William H. Moss
BY
ATTORNEYS Patented Oct. 20, 1936

2,057,690

UNITED STATES PATENT OFFICE 2,057,690

ELECTRICAL CONDUCTOR

William Henry Moss, London, England, assignor to Celanese Corporation of America, a corporation of Delaware Application November 30, 1931, Serial No. 578,195
In Great Britain December 24, 1930

7 Claims. (Cl. 173—264)

This invention relates to the production of electrical and other devices and to compositions for the said purposes.

Polymerized vinyl acetate and other polymerized vinyl compounds have excellent insulating properties, and may moreover be employed in the lacquer and plastic arts. For this purpose it has been suggested that the vinyl acetate or other vinyl compound should be mixed with camphor or the so-called camphor substitutes, for example diethyl phthalate, dibutyl phthalate, dibutyl tartrate and the sulphonamide plasticizers, such as ethyl toluene sulphonamide and the isomeric mono methyl xylene sulphonamides.

I have found that for electrical insulation purposes the well known camphor substitutes are by no means all suitable, and in fact the majority of the synthetic products which have a high plasticizing power, for example, tartrates, phthalates and sulphonamide plasticizers, so reduce the electrical resistance of the polymerized vinyl acetate or the like that the composition is rendered useless for the purpose of manufacturing electric cables.

I have now found that plasticizers which are phenolic bodies or are esters or ethers of phenolic bodies are highly suitable for plasticizing polymerized vinyl acetate and other polymerized vinyl compounds so as to produce compositions which have a high electrical resistance and are therefore suitable for insulating electrical conductors of all kinds and are particularly suitable for cable work and for other electrical apparatus in which high electric stress is set up.

The polymerized vinyl compounds, as is well known, form comparatively hard masses, and hence when an electrical conductor is directly coated therewith or is wrapped with a tape or other fabric impregnated therewith, the resulting cable lacks flexibility, so that it is essential that the polymerized vinyl compound shall be mixed with a softening agent. It will thus be seen that for electrical insulation purposes the discoveries set forth above are of the utmost importance, since, without the plasticizer, the polymerized vinyl acetate or the like renders the cable or like conductor altogether too stiff for practicable purposes, and with the majority of plasticizers the electrical insulation properties are lost.

The plasticizers for use according to the present invention may be any phenolic bodies or esters or ethers of phenolic bodies which are sufficiently non-volatile for use for plasticizing purposes and are sufficiently compatible to be incorporated with the polymerized vinyl compounds in the desired proportions. As examples of suitable plasticizers I may instance the following substances and classes of substances:—hydroxy derivatives of diphenyl, triphenyl- and tetraphenyl-methanes, ethanes and paraffins generally, and the homologues and substitution products thereof and especially the dioxy diphenyl-, triphenyl- or tetraphenyl-methane plasticizers having the general formula:

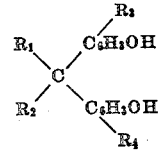

wherein $R_1$ and $R_2$ may be hydrogen or any alkyl group, for example $CH_3$, $C_2H_5$ up to $C_7H_{15}$ or even higher, or halogen derivatives thereof or aryl groups, such as $C_6H_5$, or aralkyl groups, such as $C_6H_5.CH_2$ or halogen derivatives thereof, and $R_3$ and $R_4$ may be hydrogen or halogens or carboxyl groups or hydrocarbon radicles, for example methyl, ethyl or other alkyl radicles or phenyl, benzyl or other aryl or aralkyl radicles or halogen substitution products of hydrocarbon radicles, e. g. diphenylol methane, diphenylol ethane, diphenylol propane, diphenylol octane, dioxy-triphenyl methane, dioxy-triphenyl ethane, dioxy-tetraphenyl methane, trichlor-methyl diphenylol methane $CCl_3.CH(C_6H_4OH)_2$, diphenylol-cyclohexane, diphenylol-methyl-cyclohexane, tetrabrom-diphenylol propane, 4.4'-dioxy-diphenyl-methane-3.3'-dicarboxylic acid, diphenyl- or dibenzyl-diphenylol-propane, dimethyl-diphenylol-propane (from acetone and cresol), methylene di-β-naphthol, α-β-diphenyl-α-β-diphenylol ethane (from stilbene chloride and phenol), and aurin, para-hydroxy phenyl fluorone, leuco-aurin, o.p'.p''-trihydroxy triphenyl carbinol and mixtures of trihydroxy triphenyl carbinols produced by condensation of phenol and carbon tetrachloride in presence of aluminum chloride, zinc chloride and like condensing agents followed by hydrolysis of the resulting mixture; hydroxy benzophenones, for example 4-hydroxy-benzophenone, 2.4'-, 4.4'- and 2.4-dihydroxy-benzophenones and dimethyl derivatives thereof, e.g. 3.3'-dimethyl-2.4'-dihydroxy-benzophenone and 3.3'-dimethyl-4.4'-dihydroxy benzophenone; compounds of the general formula:

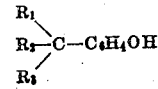

where $R_1$ and $R_2$ and $R_3$ may be hydrogen or a hydrocarbon radicle, for example methyl, ethyl, butyl, amyl or other alkyl radicles or phenyl, benzyl or other aryl or aralkyl radicles or chlorine or other halogen derivatives of hydrocarbon radicles, the radicles $R_1$, $R_2$ and $R_3$ being so chosen as to give the requisite degree of non-volatility, e. g. tertiary butyl phenol, tertiary amyl phenol, tertiary para-benzyl phenol; diphenols, as for example 4.4'-dioxy-diphenyl and homologues thereof; and the organic or inorganic esters and ethers of any of the above compounds or of other phenolic compounds, for instance the acetyl, salicylyl and phosphoric esters and methyl, ethyl or benzyl ethers. It is to be noted that where the phenolic groups are esterified or etherified, the parent phenolic bodies need not be so complex in character as those listed above, since the ester or ether groups themselves confer non-volatility upon the resulting compound. Of particular value are the acetyl esters and the methyl, ethyl and benzyl ethers of the phenols of the oxy diphenyl-, triphenyl- and tetraphenyl-methane, ethane or other paraffin type mentioned above. Such esters or ethers may readily be prepared by simple esterification or etherification of the parent phenolic bodies. The salicylyl radicle and like relatively complex organic ester radicles confer a fair degree of non-volatility so that the parent phenols may be relatively simple in character, as for example in resorcin salicylate. Of considerable importance are the phosphoric esters of phenolic compounds, and inasmuch as the phosphoric radicle itself imparts a considerable degree of non-volatility the parent phenols may be very simple in character. As examples of such phosphoric esters I may instance the phosphates of phenol, the cresols, xylenols, naphthols and their homologues and substitution products, e. g. halogenated phenols and naphthols. Tricresyl and triphenyl phosphates are especially important. Other plasticizing compounds which may be used are furfural-acetone and benzal-acetone.

The above plasticizers may be obtained for example by condensation of phenols, naphthols or their homologues or substitution products, for example chlorphenols, with ketones including both aliphatic ketones and cyclic ketones, for example acetone, cyclohexanone, methyl cyclohexanone, cyclopentanone, cycloheptanone and other ketones of the cycloparaffin series, or by condensation of furfural, benzaldehyde or other aliphatic or cyclic aldehydes with acetone or other ketones including cyclic ketones. In most cases this type of condensation is capable of yielding resinous materials but the compounds which are to be used in accordance with the present invention are the more or less crystalline intermediate chemical compounds obtainable before the condensation is carried sufficiently far to produce a wholly resinous product.

The plasticizer may be used in the composition in a proportion consistent with the softness or flexibility desired. In general it is not desirable to employ proportions based on the polymerized vinyl acetate or other polymerized vinyl compound of under 10%, and in fact it is better to employ proportions of 20 to 30% or even much higher, for example 50, 80, 100 or even 150% or more. In some cases, however, the proportion of plasticizer is limited by considerations of the product becoming unduly sticky. I have found that resins, either natural or artificial, may be added to the composition so as to increase the amount of plasticizer which the composition can contain without the films or other products resulting therefrom being unduly sticky. Whether or not the quantity of plasticizer is sufficient to render the composition sticky, the addition of resin to the composition may be of advantage from another aspect. It is found that certain resins, both natural and artificial, are capable of increasing the range of flexibility of the plasticized polymerized vinyl compositions used in accordance with the present invention, so that not only may the entire composition have a considerable degree of flexibility but this flexibility is maintained throughout a considerable range of temperature, which is of importance from the electrical insulation point of view. Thus for instance natural shellac added to a polymerized vinyl acetate composition increases the range of flexibility and moreover allows tricresyl phosphate, or any of the other phenolic plasticizers previously referred to, to be used in the composition to an extent up to about 150% or more on the weight of the polymerized vinyl acetate, assuming that the shellac is used in about an equal proportion to the vinyl acetate. Lower proportions of plasticizers may of course be employed, for example one hundred to one hundred and forty parts of plasticizer to one hundred parts of polymerized vinyl acetate and one hundred parts of natural shellac, the resulting product being of very high flexibility and high electrical resistance properties. Other natural resins may be employed either for the purpose of preventing stickiness, or for the purpose of improving the flexibility range of the composition. Kauri resin is a further example, though this does not appear to be so suitable as shellac. Again synthetic resins may be employed, and for this purpose it is best to use the synthetic resins which are not liable to further condensation when heated to temperatures up to 80 or 100° C., and preferably not liable to further condensation at considerably higher temperatures. The simple phenol-aldehyde synethetic resins are not so suitable for this purpose, though of course the desirability of adding them to the compositions depends to some extent upon the particular application of the compositions and the conditions to which they will be subjected in their subsequent application. The phenol-aldehyde synthetic resins obtained in presence of plasticizing agents as described below may however be used very satisfactorily. A highly suitable synthetic resin for the purpose of the present invention is the resin obtainable by condensation of formaldehyde with diphenylol propane or with the crude condensation product of phenol and acetone. Very useful compositions are, for example, those prepared with the aid of polymerized vinyl acetate, an equal or somewhat smaller amount down to half the quantity of diphenylol propane formaldehyde resin, and a quantity of tricresyl phosphate about equal to the quantity of diphenylol propane formaldehyde resin. Similarly the resins formed by condensation of diphenylol propane with furfural or with other aldehydes may be used, or the resinous condensation products of formaldehyde, furfural or other aldehydes with other condensation products of ketones and phenols, including the condensation products of phenols with the ketones of the cyclic paraffin series, such as cyclohexanone, cyclopentanone and the like. Again the resinous products obtainable from phenolic bodies, including phenol itself, the cresols, the xylenols, resorcin and pyrocatechin, and acetone or other aliphatic ketones or the cycloparaffin ketones, such as cyclohexanone may be used, and in addition the synthetic resins obtainable from furfural, benzaldehyde or other aldehydes and acetone or other ketones. Further useful synthetic resins are those produced from phenols including cresols and xylenols by condensation with chloracetone, furfural, allyl alcohol and other allyl compounds (compare U. S. application S. No. 399,880 filed 15th October, 1929 which has matured to Patent No. 1,940,727 dated Dec. 26, 1933), sulphur chloride, acetaldehyde, croton aldehyde, keto-butanol and chloral. These resins may be hardened with formaldehyde or furfural. In addition to synthetic resins obtainable from formaldehyde and benzene, toluene or xylene sulphonamides, the type obtainable from furfural and aniline and the resins obtainable by condensation of phenoxyacetone may be used. Moreover any of the above resins which contain phenolic groups may be esterified or etherified, and further the resins may if desired be halogenated.

It is not of course necessary that the complex of resin and polymerized vinyl acetate or other polymerized vinyl compound should have a higher electrical resistance than the polymerized vinyl compound itself, since for many purposes the specific electrical resistance of the polymerized vinyl compound is itself sufficient or more than sufficient, and the criterion to be observed is that the resin, in common with the plasticizer used, shall not substantially reduce the specific electrical resistance or at least shall not reduce it below the value required for any specific purpose. The synthetic resins listed above are particularly valuable in that the mixture with polymerized vinyl compounds has an equal or higher electrical resistance than the polymerized vinyl compounds themselves when tested under moist conditions.

With further reference to the plasticizers and resins, it will be noted that diphenylol propane, which is obtained by condensation of acetone and phenol, may be used as plasticizer and acetone phenol resin, also obtained by condensation of acetone and phenol, may be used as resin, and similarly many other intermediate products of condensation obtained before resin formation sets in or becomes substantial may be used as plasticizers and the corresponding resins may be added to the compositions. It is noteworthy therefore that it is not necessary in preparing the plasticizer to separate and purify the diphenylol propane or like intermediate product, since a small quantity of the corresponding resin is in any case not disadvantageous to the compositions and may even be desirable as described above. Before adding the plasticizers to the compositions, it is, however, desirable to separate the crude product of condensation from excess reactants, which are bodies of more or less low molecular weight. Thus for example in manufacturing diphenylol propane the crude product may be simply purified from excess phenol, for example by distillation in vacuo, and used directly for the compositions of the present invention without further purifying to the pure diphenylol propane which is a crystalline body.

Many of the synthetic resins which may be used for the compositions according to the present invention are capable of existing in an infusible insoluble state, and in this form are less suitable for the purpose of the present invention than in the form in which they are soluble. However I have found that, if the condensation to produce the resin or at least the final stage of such condensation be carried out in presence of triphenyl phosphate, tricresyl phosphate or other plasticizer for the finished resin, over-condensation to an insoluble infusible resin is readily prevented, and moreover the whole reaction is much more readily controlled. This process of carrying out at least the final stages of the condensation in presence of a plasticizer is, I believe, a novel process and constitutes an important factor in the present invention in that it enables a complex of the resin and the plasticizer to be obtained directly, which is very suitable for admixture with the polymerized vinyl compounds.

This process of preventing over-condensation may be used in the manufacture of any synthetic resins which can be condensed to the infusible insoluble state. Such synthetic resins, for example phenol aldehyde synthetic resins, prepared for example by condensation of simple phenols, such as phenol itself, cresols, chlor-phenols, or of more complex phenols such as diphenylol methane, diphenylol propane, dihydroxy benzophenone and the diphenylol naphthenes (obtained by condensation of phenols with ketones of the cycloparaffin series, e. g. cyclohexanone) with formaldehyde or its polymers, such as tri-oxymethylene and para-formaldehyde, benzaldehyde, furfural or other aldehydes or compounds containing reactive methylene groups, as for example hexamethylene tetramine, or the acetals; and the condensation products of phenolic bodies with chlor acetone.

Most of the so-called champhor substitutes which have been proposed or are in use in the nitro-cellulose industry and in the general industry of cellulose esters and ethers are also capable of plasticizing the synthetic resins with which the present invention is concerned. However, in the choice of a plasticizer for use in controlling the condensation, it is desirable that the plasticizing agent selected should not itself be capable of taking part in the condensation. Compounds which I have found particularly valuable for the purpose are the phosphates of phenols or naphthols or their homologues or substitution products including the halogenated phenolic bodies, e. g. triphenyl and tricresyl phosphates, and the other phenolic plasticizers mentioned above. It is particularly desirable to use a plasticizer which is subsequently to form part of the polymerized vinyl composition.

It is not essential that the entire polymerization and/or condensation should be carried out in the presence of plasticizers, but the plasticizers should be present in at least the stage at which the fusible solution resins would normally be converted into the infusible insoluble resin. Part of the condensation may be carried out as a separate operation. For example in the manufacture of phenol aldehyde condensation products, the initial stage of the condensation may be effected as is normal and only the last or later stages carried out in presence of the plasticizing agent. If desired the condensation may even be carried to the so-called Novolak stage and then the further condensation tending to the infusible insoluble stage be effected in presence of a plasticizing agent with the necessary further quantity of aldehyde or equivalent body.

The quantity of plasticizing agent used in the condensation may vary very considerably and I have found that very good results are obtained by using a quantity of plasticizer varying from one eighth the weight of the resin to be formed or of the intermediate resin body employed for the reaction up to twice the weight of the said resin. Inasmuch as the plasticizing agent is intimately mixed with the final resin product it will be seen that the particular application to which the resin-plasticizing agent complex is to be put determines to some extent the amount of plasticiser which is to be used, though it is to be noted that the plasticizing agent may if desired be removed from the resin after the reaction or its quantity may be reduced.

The complex of plasticizing agent and resin is very useful for a number of purposes and particularly for the manufacture of lacquers, varnishes, and coating and impregnating compositions. It may also be used directly for the manufacture of plastic masses. The complex is particularly valuable for use in lacquers, coating compositions and the like containing cellulose nitrate or cellulose acetate or other organic derivatives of cellulose and also for lacquers, etc., containing other resins, whether natural or synthetic or containing polymerized vinyl compounds. It is for this latter purpose that this process finds application in the present invention.

It is not essential that the condensation or polymerization should be carried out in presence of the exact amount of plasticizer which it is desired to use in the composition, since plasticizer may be removed from the final resin or further plasticizer may be added either together with or separately from other additions which may be made.

The following examples illustrate the manufacture of synthetic resins in accordance with this special process:—

Example 1

| | Parts |
|---|---|
| Commercial cresol | 220 |
| 40% formaldehyde solution | 180 |
| Phosphoric acid | 1 |
| Tricresyl phosphate | 100 | are heated under reflux in a jacketed vessel by means of steam or oil at 110° C. until a soft resin is formed. The soft resin is washed with water and distilled in vacuo until the resin gives a very slightly cloudy solution in acetone. The excess reagents are removed during this distillation and there remains a clear resin which is hard when cold.

Example 2

| | Parts |
|---|---|
| Crude diphenylol propane | 320 |
| 40% formaldehyde solution | 128 |
| Phosphoric acid | 1 | are heated under reflux in a jacketed vessel by means of steam or oil at 110° C. for 10 to 12 hours or until a resin is formed which is hard and brittle at ordinary temperatures. The resin is washed with boiling water to remove most of the catalyst and excess reagents, but should not be continued sufficiently to produce an over-condensation to the insoluble and infusible stage. Usually three hours' washing suffices and when excess wash water is removed the resin is a white to yellow opaque solid containing approximately 20% of water. To this batch of resin 64 lbs. of tricresyl phosphate are added and the mixture heated preferably with stirring and either in vacuo or in an open vessel until no more water is driven off. The fused mass is then raised to about 130 to 160° C. and kept at this temperature until a sample shows a slightly cloudy solution in acetone. It is then run off and allowed to cool.

Though for the purpose of the present invention polymerized vinyl acetate has been more specifically referred to above, other polymerized vinyl compounds may be employed, and the invention may be said to contemplate broadly the application of compounds which may be considered to be derivatives of polymerized vinyl alcohol and its homologues and substitution products in which the hydroxy groups are substituted by groups which lend to the vinyl compound resistance to water, as for example ester or ether groups. All such compounds are in the claims included in the generic expression polymerized vinyl compounds. I prefer to employ ester groups of organic acids, for example organic acids of the aliphatic series, such as acetic acid, chloracetic acid or propionic acid and the like or of the aromatic series, such as benzoic acid, and again it is preferable that the ester groups should not contain free hydroxy or free carboxy groups. Thus polymerized vinyl esters of monocarboxylic acids containing no hydroxy groups are very suitable for the purpose of the present invention. Similarly it is preferred to employ polymerized vinyl ethers in which the ether groups do not contain free hydroxy or carboxy groups.

The compositions, as described above, may be mixed with any other suitable ingredients depending on the particular application for which they are to be used. For lacquering, coating and impregnating purposes they may, if desired, be dissolved in more or less volatile solvents, as for example benzene, alcohol, ethyl acetate, and butyl acetate, or they may be sufficiently soft so as to allow of their application at elevated temperatures in a more or less molten condition. Other ingredients which may be added to the compositions include pigments or dyes, fillers, for example silica, French chalk or other substances which may themselves have the electrical resistance properties, or cellulose acetate or other cellulose esters or ethers in dissolved or finely divided suspended condition.

In applying the compositions of the present invention to the manufacture of insulating materials which, as already indicated, is the principal object of the present invention, the compositions may be directly applied to the electrical conductor, or they may be used to impregnate a tape, ribbon, film, fabric, sheet or the like, preferably of another material, as for example cotton, viscose or other regenerated cellulosic material or artificial fibres, films or sheets made from or containing cellulose acetate or other cellulose esters or ethers or they may be applied by any other suitable method. Cellulose esters or ethers used as base fabric or film may be in any desired stage of hydrolysis or ripening. For instance chloroform or acetone-soluble cellulose acetate materials may be used. It is preferable to employ the highly esterified or etherified celluloses.

The invention contemplates broadly the application of the compositions to any kind of material. Tapes or fabrics may be woven, knitted or netted and the tape may be the so-called bias tape. Conductors or cables already covered with rubber, silk or other insulation may be further insulated by the present processes. The actual application of the composition to the conductor or to the tape, film, fabric or the like may take place in a number of ways. If the composition be sufficiently fluid, as for example by inclusion therein of volatile solvents, it may be applied to the conductor or better to the tape, fabric, film or the like by spraying or brushing methods, sufficient of the composition being preferably applied to fill completely interstices between the threads of the tape or fabric. Alternatively the conductor, tape, ribbon, film, fabric or the like may be passed directly through a bath containing the molten or dissolved composition, and any excess removed, if desired or requisite, by suitable means, as for example by passing the cable, conductor or yarn through a die or by passing a film, ribbon, fabric or the like in contact with a doctor-blade adapted to remove the excess. A further method consists in extruding the compositions on to or around the travelling conductor, yarn, tape, fabric etc. For example a cable or a yarn containing a number of filaments may be passed through an annular stream of the composition which is thus applied to the cable or yarn in a continuous manner. Again slits or other suitably shaped orifices may be used to extrude a band of the composition on to a traveling tape, film, ribbon or fabric. Preferably such a slit is arranged on each side of the fabric or other material being coated so as to cover thoroughly both sides of the fabric or material. A further method of applying the compositions consists in moulding them on to the conductors. In the case of cables containing a number of insulated conductors the individual conductors may if desired be first insulated by means of the compositions of the present invention with or without the aid of tapes, fabrics, or other base materials, and the individually insulated conductors then embedded in a further mass of the insulating composition so as to form the cable. If desired the cable may be armoured and then sheathed with any desired finish. In the case of a sheath of rubber, a protective coating may be applied as described in U. S. application S. No. 557,993 filed 19th August, 1931, which has matured to Patent 1,977,643 dated Oct. 23, 1934.

For the purpose of obtaining a strip of insulating material it is not necessary to use an already formed fabric, since a warp of threads, say thousands of threads aligned side by side, or a relatively limited number of threads close together may be doped with the composition so that upon drying they adhere to each other and form a fabric or tape. If desired such a warp or such a collection of individual threads may be held together at more or less long intervals by suitable wefts. In the case of applying the compositions to artificial products and fabrics, as for example fibres produced from viscose or better from organic substitution derivatives of cellulose, e. g. from cellulose acetate filaments produced by the dry spinning process, such a process may be applied directly to the filaments or yarns continuously with their production. Thus for example a number of yarns of associated filaments, with or without twist, may be aligned and doped with the compositions as described, or alternatively the individual filaments may be aligned, as for example those proceeding from a line type of jet, and doped directly so that the whole adhere together.

The invention further contemplates the doping of individual filaments or individual yarns, so that they do not adhere together, and the product may then be used directly in place of natural silk for winding conductors. A further alternative consists in coating a conductor by means of the dissolved or molten composition and then wrapping or otherwise applying a tape, fabric or the like. The whole may then, if desired, be warmed to allow the fabric to sink into the vinyl composition. Again, the composition may be applied directly to a conductor, allowed to dry, and the conductor may then be wrapped with a tape, fabric or the like and finally doped with the composition. Further, the conductor may be wound first with cotton, cellulose acetate or other suitable fabric or tape and finally doped with the composition.

Where relatively heavy coatings are to be applied either directly to the conductor or to tapes, ribbons, films or other base materials it is desirable to apply a number of relatively thin coatings and to dry each coating before the application of the next coating.

In order to obtain uniform insulating properties with any given composition, it is important to standardize the drying operation which follows the application of a polymerized vinyl composition in conjunction with a small or large quantity of a volatile solvent. I have found in fact that it is highly desirable indeed to dry at an elevated temperature for a considerable period and especially for some hours. I have found that a drying effected at 100–120° C. for 3 to 4 hours yields very satisfactory results.

As already indicated the compositions and impregnated articles such as impregnated tapes, films, ribbons and fabrics are most valuable in their application to electrical insulation purposes. However, numerous other applications are possible inasmuch as I find that the high flexibility of the compositions and articles produced according to the present invention coupled with their high resistance to humid conditions render them suitable for other purposes, and particularly purposes in which high resistance to corrosion and high resistance to the attack of water or humid conditions come into consideration. Thus for example sheets or films made directly from the compositions or doped fabrics, sheets or films made from the compositions as described above may be used for wrapping paper or for purposes to which oiled silk goods are at present applied, as for example for tobacco pouches or for linings therefor, or for bandaging purposes. Individual yarns doped with the compositions may be used as gut for tennis rackets, particularly where the yarn used is a natural silk yarn. Again the compositions may be used to protect the lacquer on lacquered goods, as for example lacquered motor-car panels and the like. I find that the high resistance to water and to humid conditions, and also the flexibility or elasticity of the compositions of the present invention render them particularly useful as protective coatings for lacquers of all kinds, as for example cellulose nitrate lacquers or lacquers made from cellulose acetate or other cellulose derivatives.

The doped fabrics, films or the like may further be employed for decorative purposes, as for example in ladies' hats and for curtains etc. In this connection it may be stated that the transparency of the composite material may be varied as desired, according to the amount of polymerized vinyl compound applied to the fabric or material. This is more particularly the case when the film, tape, fabric, or other base to which the composition has been applied consists of cellulose acetate or other cellulose esters or ethers. It is therefore possible to obtain transparent effects alternating or contrasting with more or less opaque effects by varying the amount of vinyl composition applied to the fabric or other material. For instance a comparatively small amount of vinyl composition may be applied uniformly over a fabric so as to obtain a more or less opaque effect, and then a further quantity of composition applied locally, as for example through a stencil, so as to obtain transparent effects in selected areas. For producing colour effects the fabric or material which is doped may have effects already produced thereon, as for example by dyeing, printing etc., or alternatively the dope itself may be coloured or may have incorporated therein other effect materials. Again differently coloured vinyl dopes, whether molten or in the form of solution, may be applied to different areas of one and the same fabric or material, the colours being allowed, if desired, to weld into each other.

The compositions of the present invention, and more particularly the impregnated fabrics and the like, may further be used in the artificial leather industry, for example for furniture use or for book-binding etc. For this purpose it is desirable that the composition should contain a substantial quantity of filler.

The compositions also lend themselves to the manufacture of photographic or cinematographic films, for which purpose they may be applied to a base of cellulose nitrate, cellulose acetate and the like, and may actually carry the sensitized emulsion. In this particular application it is desirable that any resins which the composition may contain should be light fast.

The compositions of the present invention and especially those containing relatively small quantities of plasticizer may be used for the manufacture of containers for foodstuffs and other materials. Such containers may be made wholly of the composition or they may be in the form of cylinders, the ends of which are constituted by metal, and the cylindrical sides of which are constituted by the compositions of the invention. The compositions may for this purpose be reinforced by fabrics or other materials. Fabrics of cellulose acetate or other cellulose esters or ethers doped with the polymerized vinyl compounds so as to become transparent or doped fabrics which have been coloured either by application of colour to the fabric itself or incorporation of colour in the polymerized vinyl composition are especially useful for this purpose.

The present invention further includes laminating the doped fabrics or other materials so as to obtain a more or less thick composite product. Thus for example 6–12 or even more layers of doped fabric may be applied to each other before or after drying of the polymerized vinyl composition, and may be caused to adhere under heat and/or pressure. In the actual wrapping of cables or like electrical conductors, it is desirable to apply a number of layers of doped fabric, tape or the like to the conductor and then to apply heat or pressure so as to cause the separate layers to adhere to each other. The application of heat and pressure may be achieved in the known process of covering the cable with a lead sheath, which in some applications, as for example for submarine or subterranean cables, is desirable. In such laminated products the heat and pressure may be sufficient to cause the product to appear homogeneous. A laminated product obtained by causing adhesion between a number of thicknesses of doped fabric or other material may be applied, especially where transparent products are produced, for motor-car wind screens and windows and the like. Further the doped material and preferably the laminated product obtained from a number of sheets of such material may be applied to the manufacture of laminated glass using either ordinary window or plate glass, or if desired silica glass or glass of high silica content. The laminated product may be placed, with or without previous softening, between sheets of glass, which may, is desired, receive a previous coating of cellulose acetate, cellulose nitrate, gelatin or other suitable adhesive, though this is not necessary, and the whole pressed together to form the reinforced glass.

In addition to the direct doping of electrical conductors, textile fabrics, films, lacquered articles and the like, the invention contemplates quite broadly the application of the compositions to surfaces which it is desired to protect. Expanded metal, metal gauzes, wire netting and the like may be coated, the product being useful, for example, for cold frames, green-houses and the like.

While a number of applications, both of the compositions themselves and of the doped fabrics, films, ribbons, tapes and other products obtained therefrom have been given above, it will be readily apparent that this list of applications is by no means exhaustive, and the present invention in addition to including the compositions themselves and the doped products includes all applications of the same.

The following examples illustrate the polymerized vinyl compositions of the present invention and also illustrate their application to fabrics and the like for use for insulating purposes. The examples do not however limit the invention in any way.

*Example 3*

A cellulose acetate woven fabric weighing 1.8 to 2 ozs. per square yard is coated with the following composition:—

| | Parts |
|---|---|
| Polymerized vinyl acetate | 100 |
| Diphenylol propane formaldehyde synthetic resin | 45 |
| Tricresyl phosphate | 65 |
| Alcohol | 940 |
| Acetone | 60 | so as to give a weight of dope of from 2 to 3 ozs. per square yard. The doped fabric is then dried in air at room temperature for a considerable period or preferably at 100 to 120° C. for 1 to 5 hours. It is then cut up into strips for winding electrical conductors in known manner. The windings on the conductor may be caused to coalesce by application of heat or by application of solvents. Solvents however are less advantageous. The insulated conductor, for example an insulated cable, may if desired be covered with a lead sheath and subjected to the action of heat while enclosed in the lead sheath. The sheath may then be removed. The composition may be similarly applied to a cellulose acetate knitted fabric, for example, a lock-knit fabric, but in this case it is desirable to apply a weight of dope of 5 to 10 ozs. per square yard.

Example 4

A composition consisting of:—

| | Parts |
|---|---|
| Polymerized vinyl acetate | 100 |
| Diphenylol propane formaldehyde synthetic resin | 40 |
| Shellac | 60 |
| Tricresyl phosphate | 120 | is dissolved in a suitable solvent, for example that indicated in Example 3, and applied to a fabric as described in Example 3.

Example 5

A composition consisting of:—

| | Parts |
|---|---|
| Polymerized vinyl acetate (insoluble in alcohol) | 100 |
| Diphenylol propane formaldehyde synthetic resin | 10 |
| Tricresyl phosphate | 40 | is dissolved in a mixture of 200 parts of acetone and 800 parts of butyl acetate and applied to a knitted fabric, and especially a cellulose acetate knitted fabric, weighing 3 ozs. per square yard so as to give a weight of 5 to 10 ozs. of dope per square yard. It is then dried and applied for insulating purposes as described in Example 3.

Example 6

A polymerized vinyl compound is prepared from

| | Parts |
|---|---|
| Polymerized vinyl acetate | 100 |
| Diphenylol propane formaldehyde resin-tricresyl phosphate complex prepared as in Example 2 above and containing 25 parts of the resin and 10 parts of the plasticizer | 35 |
| Diphenylol propane | 65 |

The composition is fused at a temperature of 160 to 180° C. and is applied in this form to a cotton or cellulose acetate fabric.

Example 7

A composition consisting of:—

| | Parts |
|---|---|
| Polymerized vinyl acetate | 110 |
| Cresol-formaldehyde resin-tricresyl phosphate complex, prepared as described in Example 1 | 90 |
| Tricresyl phosphate | 35 | is dissolved in 1200 parts of alcohol and applied as described above in Examples 3 and 5.

Example 8

A composition consisting of:—

| | Parts |
|---|---|
| Polymerized vinyl acetate | 100 |
| Shellac | 80 |
| Diphenylol propane formaldehyde synthetic resin | 20 |
| Diphenlol cyclohexane | 20 |
| Triphenyl phosphate | 100 |
| Filler (e. g. silica powder) | 20–40 |
| Acetone | 100 |
| Butyl acetate | 900 | is applied by the methods described in Examples 3 and 5 above. The diphenylol propane formaldehyde synthetic resin may be replaced by a synthetic resin prepared from diphenylol propane and chloracetone.

Example 9

A composition consisting of:—

| | Parts |
|---|---|
| Polymerized vinyl acetate | 100 |
| Triphenyl phosphate | 25 |
| Alcohol | 600 | is applied as described above.

Example 10

A composition consisting of:—

| | Parts |
|---|---|
| Polymerized vinyl acetate | 100 |
| Diphenylol cyclohexane formaldehyde synthetic resin | 60 |
| Crude diphenylol propane | 40 |
| Tricresyl phosphate | 100 |
| Acetone | 200 |
| Alcohol | 600 |
| Butyl acetate | 200 | is used to coat a conductor which has already been wrapped or covered with fabric, tape or the like. The doped covered conductor is dried as previously described.

Example 11

A paper or film, and particularly a paper or film, of cellulose acetate, is coated with any of the compositions described in Examples 3 to 7 above, is dried in a similar manner, cut up into strips and wound upon an electrical conductor.

In the figure of the drawing there is illustrated an example of an electrical conductor according to the present invention, showing a flexible conductor having a core of conducting material which is insulated with a material impregnated with a composition containing polymerized vinyl acetate, a plasticizer and another resin.

What I claim and desire to secure by Letters Patent is:—

1. Electrical conductors insulated with a composition comprising polymerized vinyl acetate, a plasticizer selected from the group consisting of compounds containing phenolic groups and derivatives of said compounds wherein the phenolic groups are esterified or etherified, and another compatible resin.

2. Electrical conductors insulated with materials impregnated with a composition comprising polymerized vinyl acetate, diphenylol propane and another compatible resin.

3. Electrical conductors insulated with a composition comprising polymerized vinyl acetate, a plasticizer selected from the group consisting of compounds containing phenolic groups and derivatives of said compounds wherein the phenolic groups are esterified or etherified, and a resin selected from the group consisting of shellac and diphenylol propane-formaldehyde resin.

4. Electrical conductors insulated with materials impregnated with a composition comprising polymerized vinyl acetate, diphenylol propane and a resin selected from the group consisting of shellac and diphenylol propane-formaldehyde resin.

5. Electrical conductors insulated with materials impregnated with a composition comprising polymerized vinyl acetate, triphenyl phosphate and a resin selected from the group consisting of shellac and diphenylol propane-formaldehyde resin.

6. Electrical conductors insulated with materials impregnated with a composition comprising polymerized vinyl acetate, tricresyl phosphate and a resin selected from the group consisting of shellac and diphenylol propane-formaldehyde resin.

7. Electrical conductors having a coating of composition comprising a polymerized organic derivative of vinyl alcohol, a plasticizer selected from the group consisting of compounds containing phenolic groups and derivatives of said compounds wherein the phenolic groups are esterified or etherified, and a resin selected from the group consisting of shellac and diphenylol propane formaldehyde resin.

WILLIAM HENRY MOSS.